(12) United States Patent
Carlsson

(10) Patent No.: US 6,910,988 B2
(45) Date of Patent: Jun. 28, 2005

(54) METHOD FOR REVERSING THE DRIVING DIRECTION

(75) Inventor: Sven-Åke Carlsson, Eskilstuna (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 9 days.

(21) Appl. No.: 10/707,055

(22) Filed: Nov. 18, 2003

(65) Prior Publication Data

US 2004/0166989 A1 Aug. 26, 2004

Related U.S. Application Data

(63) Continuation of application No. PCT/SE02/00842, filed on Apr. 29, 2002, now abandoned.

(30) Foreign Application Priority Data

May 18, 2001 (SE) ................................. 0101791

(51) Int. Cl.$^7$ ........................ B60K 41/20; B60K 41/26
(52) U.S. Cl. ............................ 477/92; 192/219
(58) Field of Search ................. 477/92–93, 96, 477/77, 209, 170; 701/53–4, 62; 192/219

(56) References Cited

U.S. PATENT DOCUMENTS

| | | | | |
|---|---|---|---|---|
| 3,543,891 A | * | 12/1970 | Mathers | 477/92 |
| 3,831,721 A | * | 8/1974 | Shore | 192/219 |
| 3,913,700 A | * | 10/1975 | James | 192/219 |
| 4,300,652 A | * | 11/1981 | Redzinski et al. | 180/336 |
| 4,768,636 A | * | 9/1988 | Ito et al. | 477/78 |
| 5,875,680 A | * | 3/1999 | Lorriette | 477/92 |
| 6,644,454 B2 | * | 11/2003 | Yamada et al. | 192/219 |
| 6,811,015 B2 | * | 11/2004 | Tietze | 477/92 |

FOREIGN PATENT DOCUMENTS

GB 2226092 A * 6/1990

* cited by examiner

Primary Examiner—Roger Pang
(74) Attorney, Agent, or Firm—Novak Druce & Quigg, LLP

(57) ABSTRACT

Method and apparatus for reversing the driving direction of a vehicle in motion, in which a movement of a gear selector to a position that indicates the new intended driving direction is detected, and the vehicle's driving brakes are applied depending upon the depression of the vehicle's gas pedal.

17 Claims, 3 Drawing Sheets

METHOD FOR REVERSING THE DRIVING DIRECTION

CROSS REFERENCE TO RELATED APPLICATIONS

The present application is a continuation patent application of International Application No. PCT/SE02/00842 filed 29 Apr. 2002 which was published in English pursuant to Article 21(2) of the Patent Cooperation Treaty, and which claims priority to Swedish Application No. 0101791-2 filed 18 May 2001. Both applications are expressly incorporated herein by reference in their entireties.

BACKGROUND OF INVENTION

Technical Field and Background

The present invention relates to a method for reversing the driving direction of a vehicle in motion that includes a movement of a gear selector to a position that indicates the new intended driving direction, which is detected. The terminology of "reversing" in the present context is utilized to mean changing the direction of vehicle movement to an opposite direction from the original direction occurring when the "reversing" is affected. Such a reversing method is carried out frequently during the operation of the machinery piece more commonly known as a wheel loader. Wheel loaders are driven forwards and backwards, for short distances, during loading—an action that constitutes a large part of the machine's operating time. Typically, the vehicle is repeatedly driven forwards, braked to a stop, driven backwards, braked to a stop, and then driven forwards again.

SUMMARY OF INVENTION

As addressed in one exemplary embodiment of the invention regarding a method for reversing the driving direction of a vehicle, the reverse gear is selected by the driver using a gear selector when initiation of braking is desired in order to affect reverse travel. The turbine wheel shaft of the torque converter is then connected to the drive wheel via the gearbox in such a way that the direction of rotation of the turbine wheel is reversed. This takes place relatively instantaneously via two disc clutches in the forward and reverse gear. The turbine wheel then starts to rotate in the opposite direction relative to the torque converter's impeller that is in direct connection with the engine. In this way, the driver is able to control the engine speed by means of the vehicle's gas pedal. This means that the turbine wheel, and thereby the vehicle, are slowed down. With increased gas supply, the impeller is driven with greater torque and a stronger braking is achieved. In other words, the braking force depends upon the speed of the torque converter's impeller relative to the speed of the turbine shaft. The braking force is not proportional to the engine speed, but is a function of the performance of the torque converter.

With continued gas supply, the vehicle is braked to a stop, after which the direction of the vehicle is reversed. The only gear operation the driver carries out is thus to select reverse gear, and thereafter the reversing procedure is taken care of by the driver regulating the gas supply to the engine via the gas pedal.

The invention will be described below in the context of reversing the driving direction of a wheel loader. This is to be regarded as a preferred, but in no way limiting application of the invention. The reversing method is also applicable to other types of work machines, such as a frame-steered vehicles, so-called dumpers, and other types of vehicles, including industrial trucks.

An object of the presently disclosed invention is to achieve a method for reversing vehicle driving direction, which enables the consumption of less energy by the vehicle's engine in comparison to previously available methods. This object is achieved by the vehicle's driving brakes being applied depending upon the depression of the vehicle's gas pedal, after the gear selector has assumed the new driving direction position. In other words, the vehicle is braked by its driving brakes and not by the torque converter during the said reversing procedure. By this means, it is not necessary to use the engine for braking, which results in a reduction in fuel consumption. The level of application of the driving brakes preferably increases with increased depression of the position of the vehicle's gas pedal.

In addition, there is a reduced need to cool the vehicle's engine in comparison to previous technology that usually required that the heat generated in the torque converter during braking be dissipated via the vehicle's cooling system.

In addition, the braking becomes predictable, as the depression of the gas pedal by the driver controls the retardation. This means that the same retardation is achieved irrespective of the gear position.

In addition, the engine power can be used for a purpose other than for braking, such as raising a scoop load and thereby also assuring that this other application does not affect vehicle braking capability.

As explained, the speed of the vehicle's engine increases with increased depression of the gas pedal. This makes it possible for the driver to use the same driving strategy previous utilized. In other words, the higher the engine speed, the greater the braking power; a reaction to which the driver is accustomed.

As a preferred further development (additional feature), the vehicle's gearbox is disconnected from the vehicle's engine when the gear selector has been moved to the new (reverse) driving direction position. The engine can then be used at full power for another purpose, such as raising a load using the vehicle's bucket or forks, without this affecting the braking capability.

BRIEF DESCRIPTION OF DRAWINGS

The invention will be described in greater detail in the following, with reference to the embodiments that are shown in the attached drawings, and in which.

DETAILED DESCRIPTION

Figure 1:
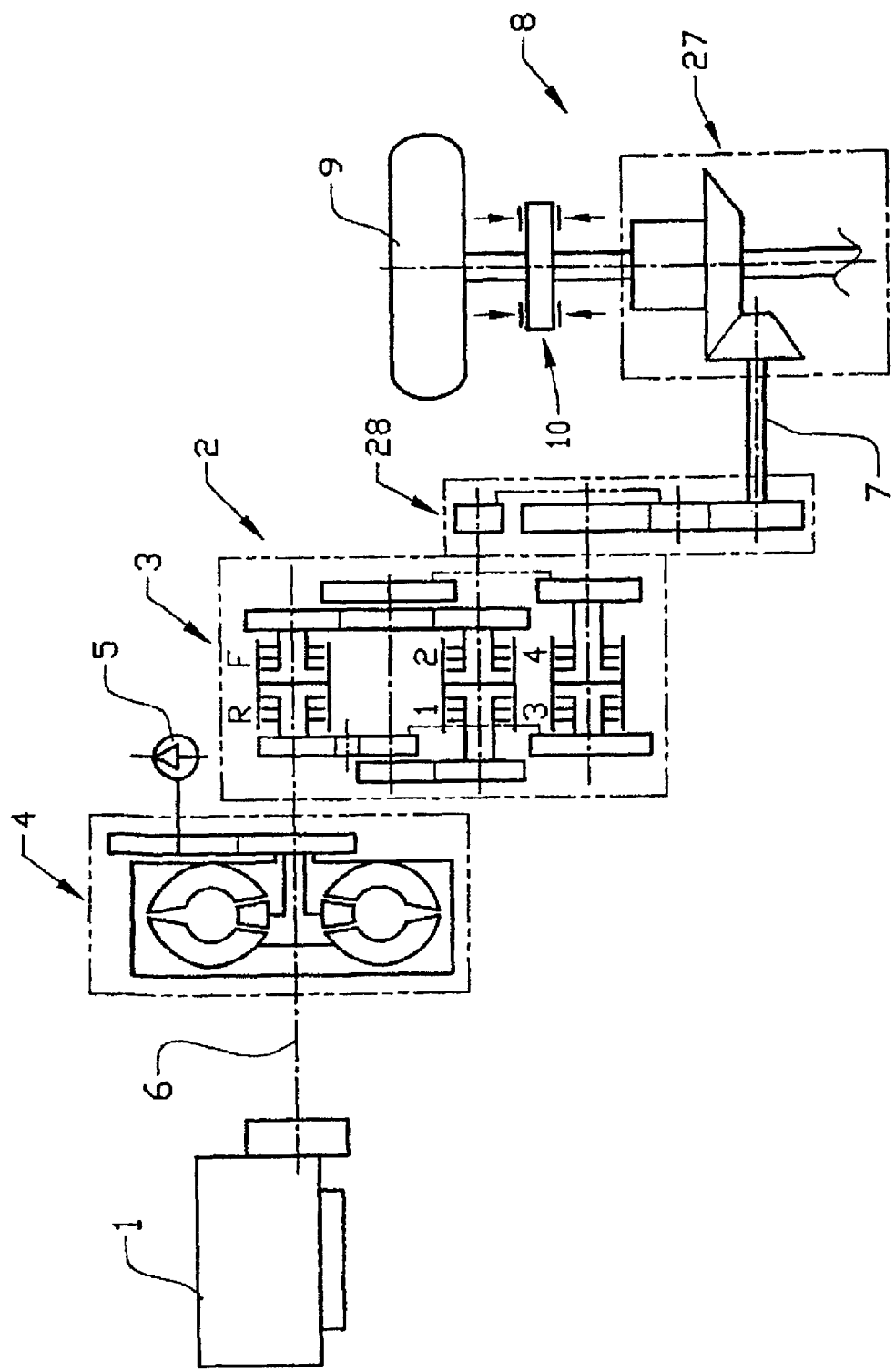
FIG. 1 is a schematic representation that illustrates an example of a vehicle's transmission in which the reversing method of the present invention can be implemented.

FIG. 1 illustrates schematically an example of a vehicle's transmission for carrying out the claimed reversing method of the present invention. By reversing, it is meant changing the direction of movement to the opposite direction from the original direction. Such a reversing method is carried out frequently during the operation of a wheel loader.

FIG. 1 shows a combustion engine 1, in the form of a diesel engine, an automatic gearbox 2 and a hydrodynamic torque converter 4. The gearbox 2 comprises a forward and reverse gear 3. FIG. 1 also shows a pump 5 for the vehicle's lifting hydraulics, which pump (like the torque converter) is driven by an outgoing shaft 6 from the engine 1. An outgoing shaft 7 from the gearbox 2 leads to a differential gear 27 on a wheel axle 8, on which the vehicle's driving wheels 9 are arranged. A driving brake 10 is arranged on each of the wheels 9.

The gearbox consists of an electronically controlled automatic gearbox of the power-shift type.

Figure 2:
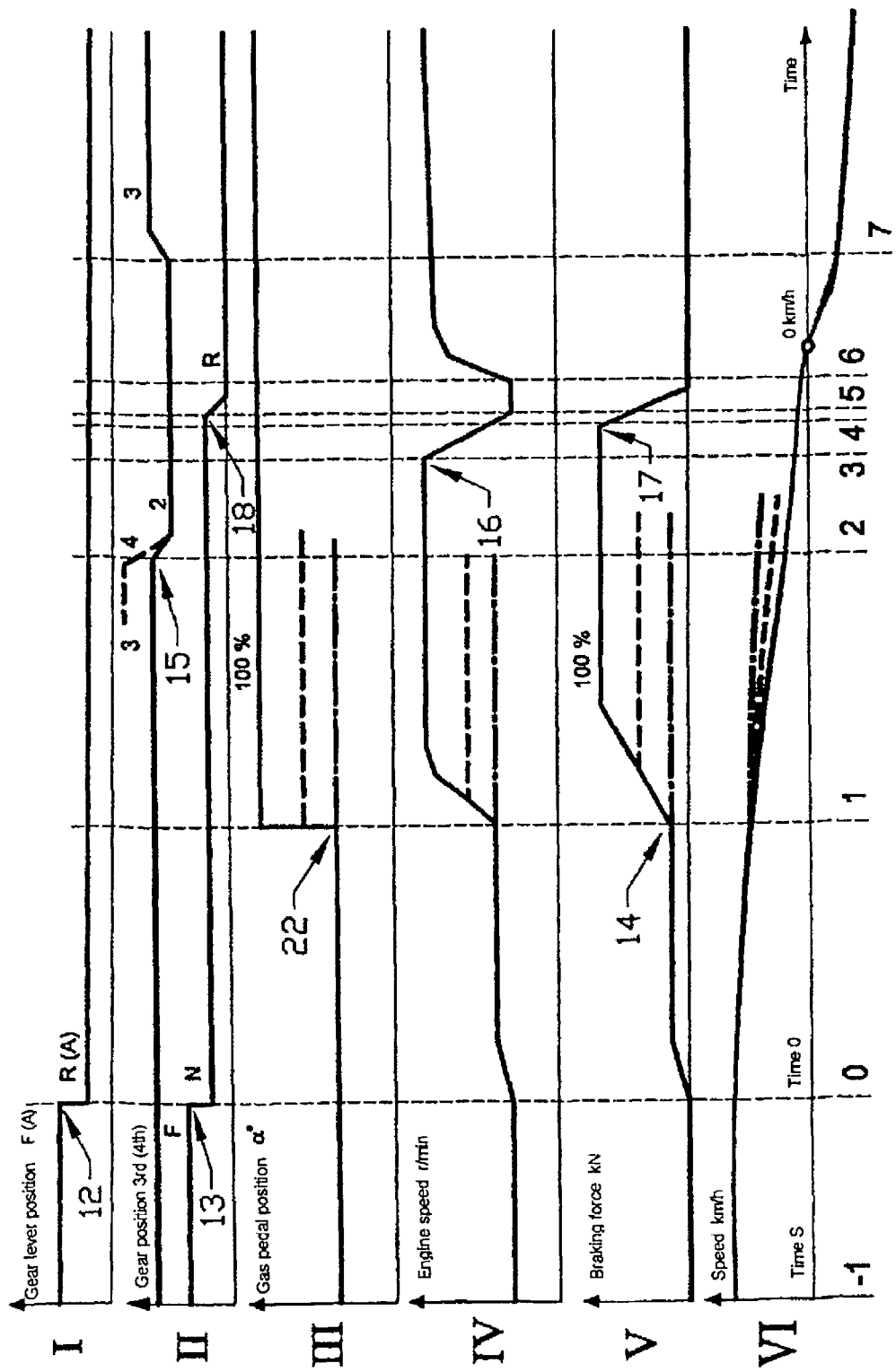
FIG. 2 is a series of six graphs depicting various parameters, as a function of the time, for a method for reversing the vehicle's driving direction executed according to the teachings of the present invention.

FIG. 2 shows six graphs of various parameters, as functions of the time, for a first embodiment of the reversing method. The uppermost graph, I, illustrates the position of a gear selector or gear lever. The second graph down, II, shows the gear positions in the gearbox 2. The third graph down, III, shows the position of the vehicle's gas pedal. The fourth graph down, IV, shows the engine speed. The fifth graph down, V, shows the braking force. The sixth graph down, VI, shows the speed of the vehicle.

Figure 3:
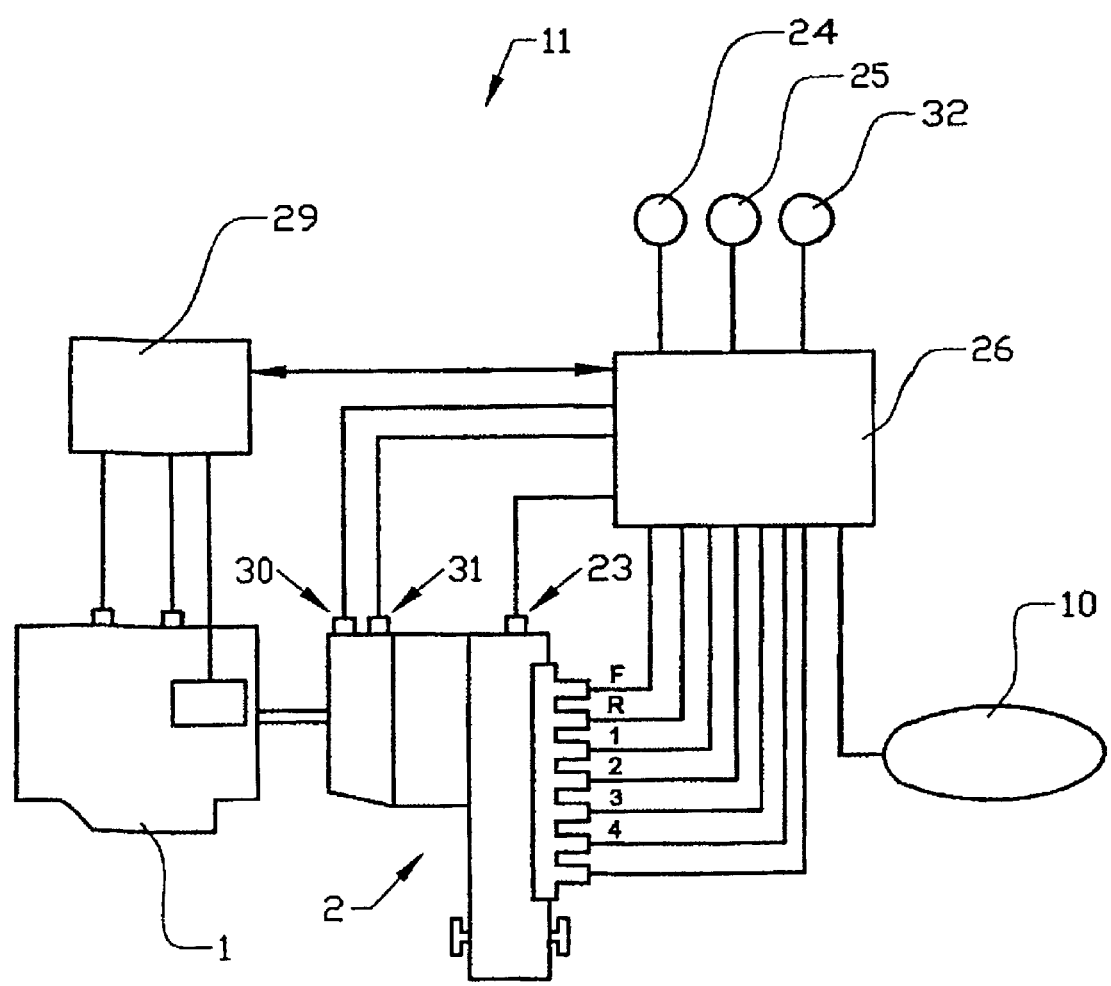
FIG. 3 is a schematic representation showing an arrangement for controlling the reversing method of the present invention.

FIG. 3 shows, in addition, an arrangement 11 for controlling the reversing method. The arrangement comprises (includes, but is not limited to) a first control unit 26 (or ECU, Electrical Control Unit) with software for controlling execution of the method. The control unit, ECU 26, is also often called a CPU (Control Power Unit).

As an example, the procedure begins by the wheel loader being driven in a first direction (forwards) with a first gear position selected and with a first speed. If needed, a third gear is selected and the vehicle is moving at a speed of, for example, 15 km/h. The driver now wants to change the driving direction from the first direction (forwards) to the reverse direction (backwards) while a second gear is selected. He therefore moves the gear selector to a position that indicates the new intended backwards driving direction and second gear is still indicated. The movement of the gear selector to the new position is detected (represented by the reference numeral 12 in the graphs of FIG. 2) by a first detector 25 connected to the control unit 26.

Upon movement of the gear lever or after detection of the new gear position, the vehicle's main gearbox 28 is disconnected 13 (graph II of FIG. 2) from the vehicle's engine 1 via the forward and reverse gear 3. The engine power can now be used in its entirety to supply hydraulic functions via the pump 5 and other consumers of power on the vehicle. The engine speed and the braking force are now increased slightly, while at the same time the vehicle's speed is reduced as illustrated in the graphs IV—VI after time-zero.

For braking the vehicle, the driver depresses 22 (graph III of FIG. 2) the gas pedal, which controls the application 14 (graph V of FIG. 2) of the vehicle's driving brakes 10, that is the wheel brakes. The position of the gas pedal is detected for this purpose by a second detector 24. More specifically, the level of application of the driving brakes is controlled as a function of the position of the vehicle's gas pedal. The vehicle's retardation (braking) can hereby be controlled as required, for example linearly or non-linearly.

The arrangement 11 comprises a second control unit 29 (FIG. 3) for controlling the speed of the engine 1. The second control unit 29 is functionally connected to the first control unit 26 and obtains information therefrom concerning the desired engine speed. This desired engine speed is in turn controlled by the degree of depression of the gas pedal. This means that the driver can use a driving strategy in which the higher the engine speed, the greater the braking force that is developed.

The engine speed is thus increased with increased depression of the gas pedal and the speed of the vehicle is reduced. The broken lines in FIG. 2 show the engine speed, the braking force and the speed of the vehicle in the event of a reduced depression of the gas pedal and the chain-dotted lines show the engine speed, the braking force and the speed of the vehicle when the gas pedal is not operated.

The engine speed is detected via a sensor 30 and the speed of a turbine in the torque converter 4 is detected via an additional sensor 31. These sensors are connected to the first control unit 26. On the basis of these detected values, a soft application of the driving brakes 10 can be carried out.

A third detector 32 detects depression of the vehicle's brake pedal. The third detector 32 is connected to the control unit 26, whereby the braking force generated by the depression of the gas pedal can be intensified by depression of the brake pedal. In other words, the algorithm that the ECU 26 sends out to the driving brakes 10 is strengthened upon depression of the brake pedal.

After braking has commenced via the depression of the gas pedal, the ECU 26 controls a number of operations automatically depending upon the vehicle's speed. In the context of the present disclosure, the terminology, "automatic," is used to denote the characteristic that the so-described function is carried out based on programming of one of the controlling control units. Often, initiation of the automated functionality will be based on a sensed condition such as the position of the gear selector or the speed of the vehicle.

The vehicle's speed is detected by sensors 23 in a conventional way; for example, by measurement of the speed of rotation of a shaft inside the gearbox 2. After disconnection 13 of the gearbox 2, a change down 15 from third gear to second gear is carried out automatically when the speed is less than a first predetermined value. The broken line in graph II of FIG. 2 shows the case in which fourth gear is engaged, instead of third gear, and thereafter a change-down to second gear is carried out from fourth gear.

When the vehicle's speed is less than a second predetermined value, the engine speed is automatically reduced 16 in order to give a soft connection of the reverse gear R in the forward and reverse gear 3.

When the vehicle's speed is less than a third predetermined value, the driving brakes 10 are disconnected 17 smoothly.

When the vehicle's speed is less than a fourth predetermined value that is close to zero, a soft, stepless change from forward F to reverse position R in the forward and reverse gear 3 is commenced 18. With continued gas supply, the vehicle is accelerated in the new direction (backwards). This takes place suitably at essentially the same time as the driving brakes 10 are disconnected.

In other words, the reversing procedure is controlled in accordance with a predetermined sequence after the gear selector has been moved to the position that indicates a new intended driving direction (reverse) and the gas pedal has been activated.

In preferred embodiment, the driving brakes 10 are applied as a function of the position of the gas pedal and, more specifically, linearly up to a specific value, which corresponds to the position of the gas pedal. In this way, the driver experiences accustomed vehicle responses; that is, with increased depression of the gas pedal, the vehicle is braked more. In other words, the higher the engine speed, the greater the braking force.

By means of disk clutches (friction clutches) in the forward and reverse gear, the reverse gear is selected gradually while at the same time the driving brakes 10 are gradually deactivated during the change of direction.

As an alternative or supplement to the application of the driving brakes as a function of the position of the gas pedal, the application can be carried out in accordance with a predetermined sequence.

Among others, the term gear selector covers both a single operating device controlling both the driving direction and the gear position, and also a separate operating device controlling the driving direction and another separate operating device controlling the gear position.

The invention is not to be considered to be restricted to the abovementioned embodiments, but a number of further variants and modifications are possible within the framework of the patent claims.

For example, the gearbox design shown in FIG. 1 is only to be regarded as an example of a gearbox that can be used for carrying out the reversing method.

In addition, the two control units 26, 29 can be integrated into a single control unit.

As an alternative to a change downwards being carried out automatically when the speed is less than a first predetermined value, the changing down can be carried out instead after a certain period of time after the commencement of the braking procedure and, if required, also depending upon the degree of application of the brakes.

As an alternative to detecting the vehicle's speed as claimed in the example above and a reduction in the engine speed being carried out automatically when the vehicle's speed is less than a second predetermined value, the engine speed can be reduced instead after a certain period of time following the commencement of the braking procedure and, if required, also depending upon the degree of application of the brakes.

As an alternative to detecting the vehicle's speed and disconnecting the driving brakes when the vehicle's speed is less than a third predetermined value, the disconnection can be carried out instead after a certain period of time after the commencement of the braking procedure and, if required, also depending upon the degree of application of the brakes.

As an alternative to detecting the vehicle's speed as exemplarily described, and commencing a change from forward to reverse position in the forward and reverse gear when the vehicle's speed is less than a fourth predetermined value that is close to zero, the change can be carried out instead after a certain period of time after the commencement of the braking procedure and, if required, also depending upon the degree of application of the brakes.

The invention has been described above in the case when a reversing of driving direction from forwards to backwards is being carried out, but it is of course also within the scope of the patent claims to reverse the driving direction from backwards to forwards in a corresponding way. In addition, the example described above, with changing from third forward gear to second reverse gear is, of course, only to be regarded as an example. In other words, the method can start with a different gear selected, such as second or fourth gear, and also end with a different gear selected, such as third or fourth gear.

What is claimed is:

1. A method for reversing the driving direction of a vehicle that is in motion, and in which a movement of a gear selector to a position that indicates the reverse driving direction is detected, said method comprising:

applying the vehicle's driving brakes (10) in dependence upon a degree of depression of the vehicle's gas pedal after the gear selector has assumed the reverse driving direction position.

2. The method as recited in claim 1, wherein the driving brakes (10) are applied proportionally to a change in position of the gas pedal.

3. The method as recited in claim 1, wherein a speed of an engine (1) of the vehicle is increased with increased depression of the gas pedal.

4. The method as recited in claim 1, wherein a gearbox (2) of the vehicle is disconnected (13) from the vehicle's engine (1) when the gear selector is detected to have been moved to the reverse driving direction position.

5. The method as recited in claim 4, wherein a change (15) in the gearbox is effected from the current gear position to a position that indicates the selected gear for driving in the reverse direction after disconnection (13) of the vehicle's gearbox (2) from the vehicle's engine (1).

6. The method as recited in claim 1, wherein after application of the vehicle's driving brakes, the engine speed is automatically reduced (16).

7. The method as recited in claim 1, wherein after application of the vehicle's driving brakes and when the vehicle's speed is approaching zero, the driving brakes (10) are deactivated (17).

8. The method as recited in claim 7, wherein upon deactivation of the driving brakes (10), control of the brakes (10) via the position of the gas pedal ceases and the driving brakes (10) are gradually deactivated (17) until the speed of the vehicle is zero.

9. The method as recited in claim 1, wherein after application of the vehicle's driving brakes (10) and when the vehicle's speed has dropped to a value close to zero, the gearbox (2) is gradually automatically connected (18) to the engine (1) in such a way that the vehicle is moved in the new driving direction.

10. The method as recited in claim 9, wherein the driving brakes (10) are gradually deactivated (17) at the same time as said gradual connection of the gearbox (2) to the engine (1) is effected (18).

11. The method as recited in claim 9, wherein the gradual connection of the gearbox (2) is carried out (18) via disc clutches.

12. The method as recited in claim 1, wherein the gearbox (2) comprises an electronically controlled automatic gearbox.

13. The method as recited in claim 1, wherein the vehicle comprises a work machine.

14. The method as recited in claim 13, wherein the work machine is configured as a wheel loader.

15. A method for reversing the driving direction of a moving vehicle, said method comprising:

inputting, by an operator of a forward traveling vehicle, of a command that is detected by an automated control unit of a drive train of the vehicle, said command being indicative of a desire of the operator to reverse the travel direction of the forward traveling vehicle;

applying the vehicle's driving brakes (10), via the automated control unit, in an amount corresponding to a degree of depression of an accelerator of the vehicle after the reverse command has been detected.

16. The method as recited in claim 15, further comprising:

controlling the speed of an engine (1) of the vehicle to an amount corresponding to the degree of depression of the accelerator of the vehicle after the reverse command has been detected;

disconnecting the engine from the drive train; and controlling braking effects of the vehicle to approximate conventional operation of a vehicle that utilizes engine power to directly brake the vehicle, via the drive train, thereby providing a familiar vehicle operational feel to the operator.

17. The method as recited in claim 16, further comprising:

directing a predominance of the power of the disconnected engine to vehicle operations other than the braking function.

* * * * *